(12) United States Patent
Guillaume et al.

(10) Patent No.: US 10,907,608 B2
(45) Date of Patent: Feb. 2, 2021

(54) HYDRAULIC INSTALLATION AND METHOD FOR OPERATING THE SAME

(71) Applicant: GE Renewable Technologies, Grenoble (FR)

(72) Inventors: Renaud Guillaume, Grenoble (FR); Pierre Yves Lowys, Grenoble (FR); Arnaud Legrand, Grenoble (FR); Philippe Girin, Grenoble (FR)

(*) Notice: Subject to any disclaimer, the term of this patent is extended or adjusted under 35 U.S.C. 154(b) by 249 days.

(21) Appl. No.: 15/759,885

(22) PCT Filed: Sep. 9, 2016

(86) PCT No.: PCT/EP2016/071315
§ 371 (c)(1),
(2) Date: Mar. 14, 2018

(87) PCT Pub. No.: WO2017/046012
PCT Pub. Date: Mar. 23, 2017

(65) Prior Publication Data
US 2018/0252198 A1 Sep. 6, 2018

(30) Foreign Application Priority Data
Sep. 14, 2015 (EP) ..................................... 15290230

(51) Int. Cl.
*F03B 3/10* (2006.01)
*F03B 3/02* (2006.01)
(Continued)

(52) U.S. Cl.
CPC ................ *F03B 3/106* (2013.01); *F03B 3/02* (2013.01); *F03B 3/183* (2013.01); *F03B 11/002* (2013.01);
(Continued)

(58) Field of Classification Search
CPC .. F03B 3/106; F03B 3/02; F03B 3/183; F03B 11/002; F03B 11/02
See application file for complete search history.

(56) References Cited

U.S. PATENT DOCUMENTS 3,174,719 A * 3/1965 Sproule ................. F03B 11/002
415/110
3,239,193 A * 3/1966 Kerensky .............. F03B 11/006
415/110
(Continued)

FOREIGN PATENT DOCUMENTS

JP        S55-7916 A      1/1980
JP        S57-181974 A    11/1982
(Continued)

OTHER PUBLICATIONS

Extended European Search Report and Opinion issued in connection with corresponding EP Application No. 15290230.0 dated Feb. 24, 2016.
(Continued)

*Primary Examiner* — David E Sosnowski
*Assistant Examiner* — Theodore C Ribadeneyra
(74) *Attorney, Agent, or Firm* — Dority & Manning, P.A.

(57) ABSTRACT

The present invention generally relates to hydraulic machinery, such as hydraulic turbines. More specifically, the invention is directed to optimizing power consumption when the turbine is used in condenser mode. The present invention provides a novel hydraulic installation where the reduction of pressure in the spiral case during condenser mode operations is more efficient, limiting the power consumption if compared to state-of-the-art installations.

14 Claims, 6 Drawing Sheets

(51) Int. Cl.
  *F03B 11/00* (2006.01)
  *F03B 3/18* (2006.01)
  *F03B 11/02* (2006.01)
(52) U.S. Cl.
  CPC ......... *F03B 11/02* (2013.01); *F05B 2270/301* (2013.01); *Y02E 10/223* (2013.01); *Y02E 10/226* (2013.01)

(56) References Cited

U.S. PATENT DOCUMENTS

| | | | | |
|---|---|---|---|---|
| 3,264,485 | A * | 8/1966 | Naganuma | F03B 3/103 290/40 R |
| 3,307,828 | A * | 3/1967 | Willi | F03B 11/002 415/116 |
| 3,985,464 | A * | 10/1976 | Hachiya | F03B 3/103 415/1 |
| 4,158,525 | A * | 6/1979 | Kawase | F03B 15/005 415/1 |
| 4,179,237 | A * | 12/1979 | Ogiwara | F03B 11/002 415/1 |
| 2010/0260622 | A1 * | 10/2010 | Couston | F03B 3/02 417/375 |
| 2011/0188991 | A1 * | 8/2011 | Ciocan | F03B 3/125 415/81 |
| 2011/0293400 | A1 * | 12/2011 | Bremond | F03B 11/00 415/1 |
| 2012/0121386 | A1 * | 5/2012 | Dahlhaug | F03B 11/002 415/121.3 |
| 2012/0121387 | A1 * | 5/2012 | Dahlhaug | F03B 3/125 415/121.3 |
| 2014/0079532 | A1 * | 3/2014 | Kurosawa | F03B 11/04 415/1 |
| 2016/0010618 | A1 * | 1/2016 | Sabourin | F03B 3/02 415/80 |
| 2016/0273510 | A1 * | 9/2016 | Mukai | F03B 11/002 |

FOREIGN PATENT DOCUMENTS

| | | | |
|---|---|---|---|
| JP | S58-106180 | A | 6/1983 |
| JP | 11324888 | A * | 11/1999 |
| JP | H11-324888 | A | 11/1999 |
| JP | 2001-165024 | A | 6/2001 |
| JP | 2001165024 | A * | 6/2001 |

OTHER PUBLICATIONS

International Search Report and Written Opinion issued in connection with corresponding PCT Application No. PCT/EP2016/071315 dated Nov. 14, 2016.

International Preliminary Report on Patentability issued in connection with corresponding PCT Application No. PCT/EP2016/071315 dated Mar. 20, 2018.

* cited by examiner

HYDRAULIC INSTALLATION AND METHOD FOR OPERATING THE SAME

TECHNICAL FIELD

The present invention generally relates to hydraulic installations, such as hydraulic turbines. More specifically, the invention is directed to optimising power consumption when the turbine is used in condenser mode.

BACKGROUND

As well known, it is common practise for Francis turbine to evacuate water from the runner when the generator is disconnected and thus electricity is not produced. This state of operation is generally referred to as "condenser mode", wherein the electrical output is not in the form of electric power. Nevertheless, the turbine is advantageously kept at a synchronous speed so that it can be quickly brought back to the normal operation mode, where the runner is connected to the generator and electric power is delivered.
To this purpose, such condenser operation mode is achieved by closing the wicket gates and then admitting pressurised air into the runner housing.
A technical problem which arises from such operational mode is that the pressure of the water inside the spiral case usually tends to reach high levels, which could affect the power consumption of the turbine. To this regard, a water passageway is usually provided between the summit of the spiral case and the underlying draft tube. This way, a flow of water naturally moves from the spiral case to the draft tube in the direction of a negative pressure gradient.
However, such technical expedient does not provide a satisfying solution to the aforesaid technical problem, as it is proven that power consumption for state-of-the-art installations is still not optimal.

SUMMARY OF THE INVENTION

It is an object of the present invention to solve the aforementioned technical problems by providing a hydraulic installation as substantially defined according to independent claim 1.
It is a further object of the present invention to provide a method for retrofitting an existing hydraulic installation as substantially defined in independent claim 13.
According to an aspect of the invention, this object is obtained by a hydraulic installation, comprising a hydraulic circuit which comprising a spiral casing which defines an annular passage including a plurality of wicket gates distributed there along; a runner chamber in fluid communication with the spiral casing and located downstream of the wicked gates; a runner rotatable in runner chamber; a draft tube arranged below the runner; a source of pressurised air in fluid communication with the draft tube; wherein the hydraulic installation further comprises a first connecting element fluidly connected to the spiral case and has an end discharging in atmosphere or, as an alternative to the first connecting element, it comprises a second connecting element fluidly connected to hydraulic circuit having an end discharging in the draft tube, wherein the second connecting element comprises a pump.

According to a preferred aspect of the invention, the first connecting element intercepts the hydraulic circuit in correspondence of the spiral casing.

According to a preferred aspect of the invention, the first connecting element intercepts the hydraulic circuit in correspondence of a gap of the runner chamber, the gap being located between the wicket gates and the runner.

According to a preferred aspect of the invention, the second connecting element intercepts the hydraulic circuit in correspondence of the spiral casing.

According to a preferred aspect of the invention, the second connecting element intercepts the hydraulic circuit in correspondence of a gap of the runner chamber, the gap being located between the wicket gates and the runner.

According to a preferred aspect of the invention, the hydraulic installation comprises one or more pressure sensors arranged within the spiral case.

According to a preferred aspect of the invention, the hydraulic installation comprises a first control unit configured to receive an input signal correspondent to a pressure value from the pressure sensors and elaborate an output control signal directed to the pump.

According to a preferred aspect of the invention, the first connecting element comprises an opening/closure valve.

According to a preferred aspect of the invention, the hydraulic installation comprises a second control unit configured to receive an input signal correspondent to a pressure value from the pressure sensors and elaborate an output control signal directed to the opening/closure valve.

According to a preferred aspect of the invention, the wicket gates in the annular passage have an adjustable pitch such to be moved between an open position, allowing water passage to the runner, and a closed position where the water passage is interrupted.

According to a preferred aspect of the invention, the hydraulic installation further comprises a third control unit configured to receive an input signal correspondent to a pressure value from the pressure sensors and elaborate an output control signal directed to adjust the pitch of the wicket gates.

According to a preferred aspect of the invention, the first connecting element or the second connecting element intercepts the spiral casing at a summit thereof.

According to a preferred aspect of the invention, the runner is located radially in the annular passage.

It is a further object of the present invention to provide a method for retrofitting an existing hydraulic installation, wherein the hydraulic installation comprises a hydraulic circuit comprising a spiral casing which defines an annular passage including a plurality of wicket gates distributed there along; a runner chamber in fluid communication with the spiral casing and located downstream of the wicket gates; a runner rotatable in the runner chamber; a draft tube arranged below the runner; a source of pressurised air in fluid communication with the draft tube (5); wherein the method includes the step of providing a first connecting element fluidly connected to the hydraulic circuit, the first connecting element having an end discharging in atmosphere or, in alternative, includes the step of providing a second connecting element fluidly connected to the hydraulic circuit, the second connecting element comprising a pump. According to a preferred aspect of the invention, the method for retrofitting an existing hydraulic installation further includes the step of positioning an opening/closure valve along the first connecting element.

It is a further object of the present invention to provide a method for operating a hydraulic installation, the hydraulic installation comprising a hydraulic circuit which comprises a spiral casing which defines an annular passage including a plurality of wicket gates distributed there along, the wicket gates having an adjustable pitch; a runner chamber in fluid communication with the spiral casing and located downstream the wicket gates; a runner rotatable in the runner chamber; a draft tube arranged below the runner; a source of pressurised air in fluid communication with the draft tube; wherein the hydraulic installation comprises a first connecting element arranged between the spiral casing and having an end discharging in atmosphere, the second duct comprising an opening/closure valve; or, in alternative, a second connecting element arranged between the hydraulic circuit and the draft tube, the second connecting element comprising a pump; wherein the method includes the step of measuring the pressure inside the spiral casing and elaborate a control output signal, based on the pressure measurement, directed to adjust the pitch of the wicket gates or to control the opening/closure of said valve or to regulate the pump.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

An exemplary preferred embodiment will be now described with reference to the aforementioned drawings.

DETAILED DESCRIPTION OF THE INVENTION

Figure 1:
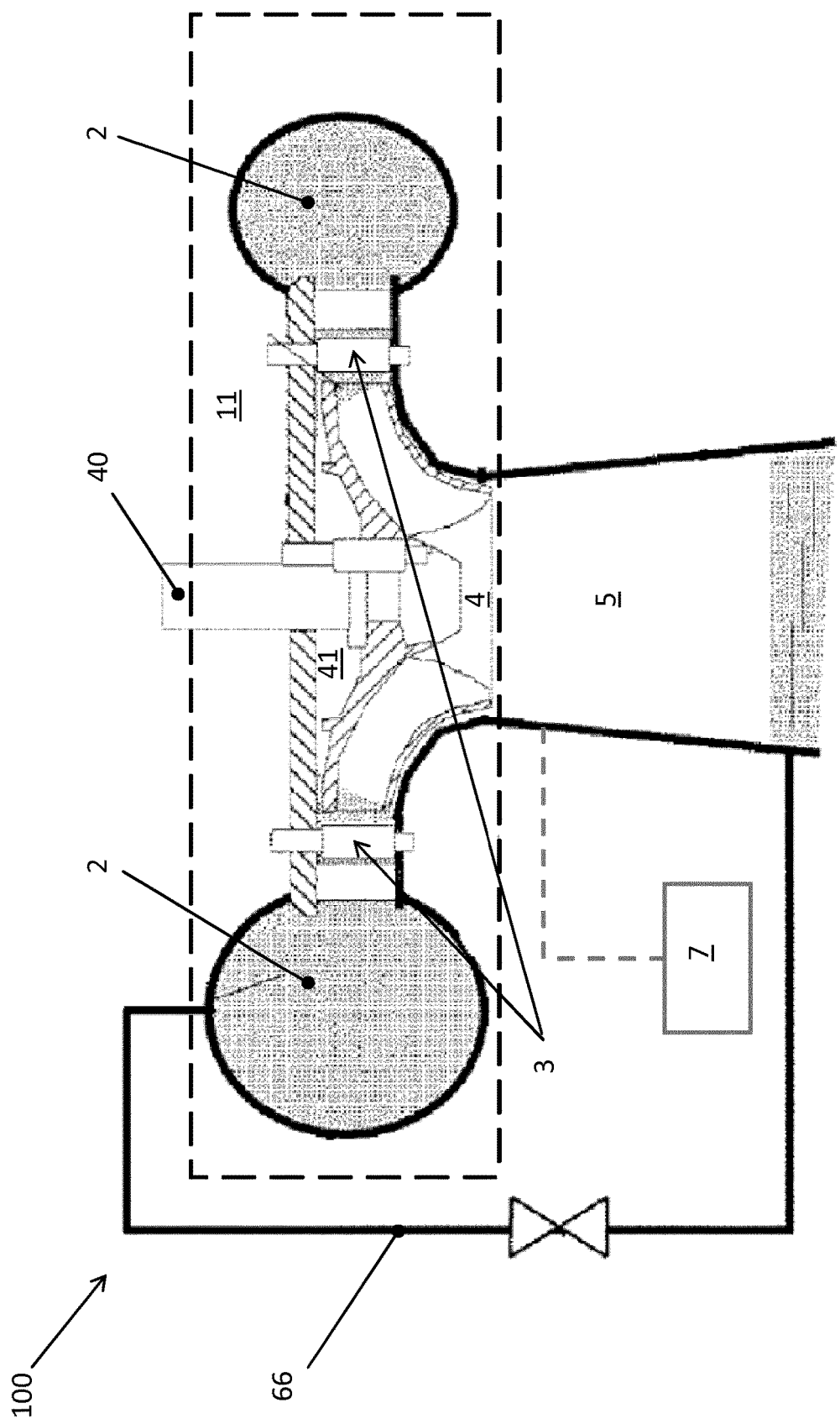
FIG. 1 shows a front sectional view of a hydraulic installation according to the prior art.

With reference to FIG. 1, it is shown a hydraulic installation in front-sectional view, in particular a Francis or a reversible Francis-type turbine 100, according to the prior art.

In particular, Francis or reversible Francis turbine 100 comprises a hydraulic circuit, generally indicated in the figure with a dashed box having numeral reference 11, which comprises a spiral casing 2 which defines a spiral passage where the water flows, and a plurality of wicket gates 3 uniformly distributed there along. Radially located in the annular passage is a runner 4 which is put in rotation by the flow of water and located into a runner chamber 41.

The wicket gates provided in the annular passage have an adjustable pitch such to be moved between an open position, allowing passage of water, and a closed position where the flow of water is interrupted. Runner 4 is in turn integral to a shaft 40 for the supply of electric power.

A draft tube 5 is positioned below the runner, serving as a conduit which connects the exit of the runner to a tail race where the water is finally discharged.

When the Francis turbine 100 is used in the so-called "condenser mode", dewatering of runner 4 is achieved by positioning the wicket gates in a closed configuration, such not to allow the passage of water.

Additionally, the draft tube 5 is dewatered with the aid of a source of pressurised air 7 in fluid communication with the draft tube.

During this mode of operation, where the runner 4 is kept at synchronous speed, the pressure in the spiral case 2 may rise to levels which could cause an unwanted passage of water through the wicket gates. To this purpose, a duct 66 is arranged between the spiral case 2 and the draft tube 5, and intercepts the spiral casing 2 at a summit thereof. By means of duct 66, water flows along a direction of a negative pressure gradient from the spiral case to the draft tube. This way the pressure in the spiral case 2 is reduced. However, it has proven that such solution does not solve in a satisfactory manner such technical problem because residual water rises in the space between runner 4 and the wicket gate. The residual water is responsible on the main part of the total installation active power consumption.

Figure 2:
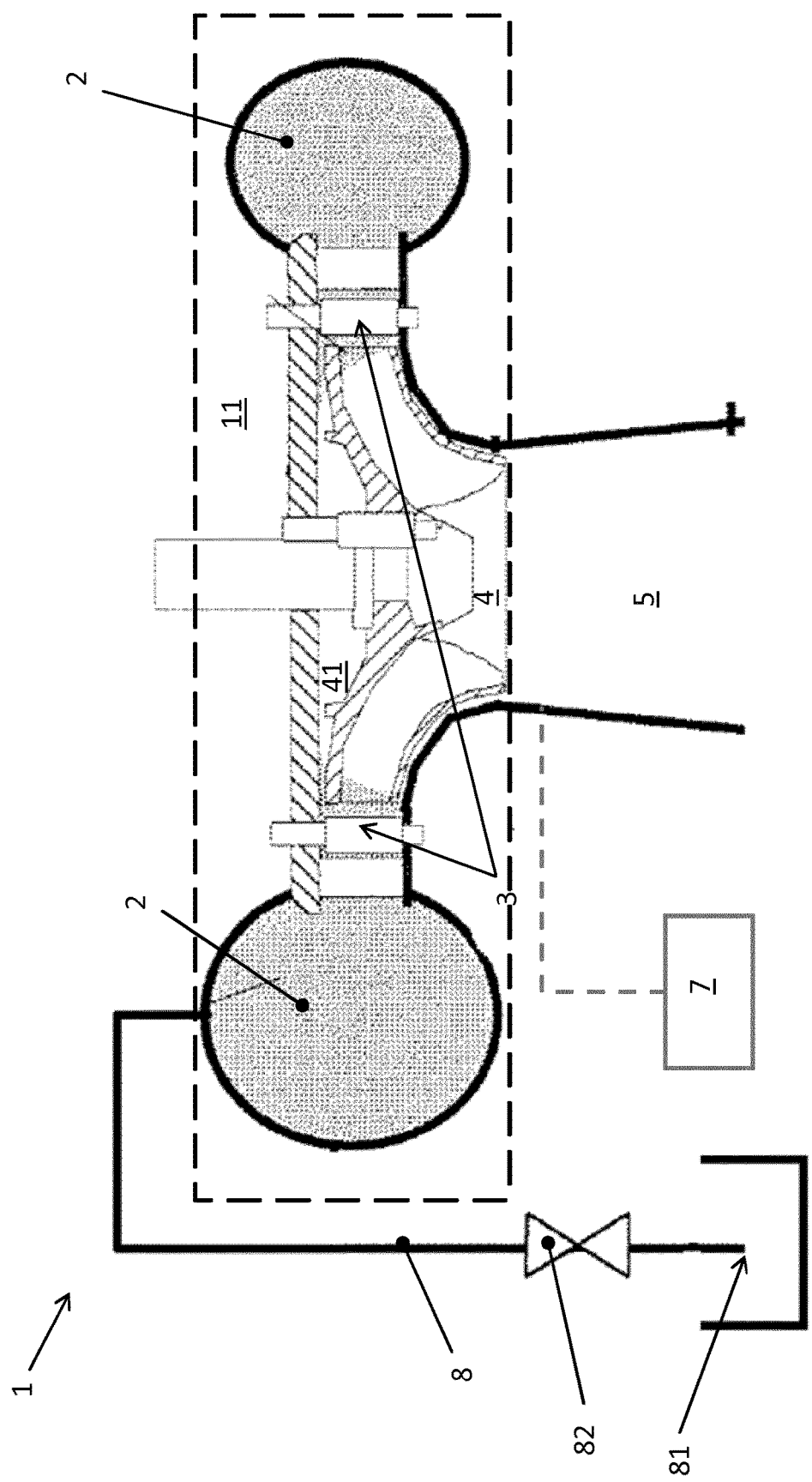
FIGS. 2-5 show front sectional views of a hydraulic installation according to different embodiments of the present invention.
Figure 3:
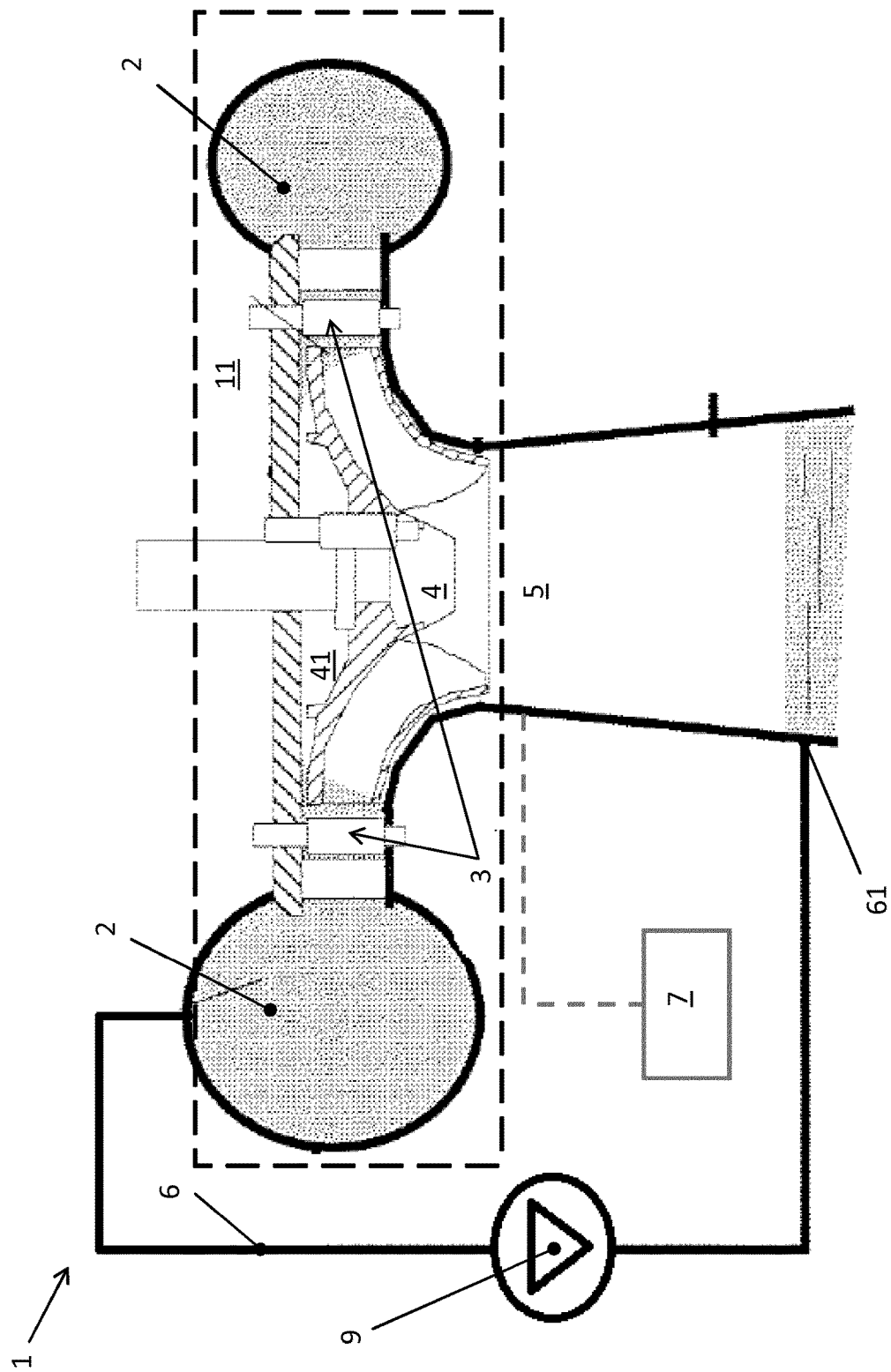

With reference to FIGS. 2 and 3, it is shown a front sectional view of a hydraulic installation 1, in particular a Francis turbine, according to a first embodiment of the present invention.

The Francis turbine 1 according to the invention differs from a known installation in that it comprises a first connecting element 8 fluidly connected to the hydraulic circuit, in particular to the spiral case 2, which has an end 81 discharging in the atmosphere. This first connecting element 8 with the exhaust at atmospheric pressure may be placed in addition or in alternative to the duct arranged between the spiral case and the draft tube (not shown) and it facilitates the process of reducing the pressure inside the spiral case 2. More advantageously, spiral case 2 may be provided with pressure sensors (not shown) arranged therein to monitor the pressure value during the condenser mode operational state. The first connecting element 8 may also be provided with an opening/closure valve 82 to control/adjust the discharge of water in atmosphere.

In alternative, with reference to FIG. 3 the hydraulic installation 1 may comprise a second connecting element 6 arranged between the hydraulic circuit, and in particular the spiral case 2, and the draft tube 5. The second connecting element 6 comprises a pump 9 located along its path. This way, the flow of water from the spiral case 2 to the draft tube 5 is adjusted/regulated by means of the pump 9.

Figure 4:
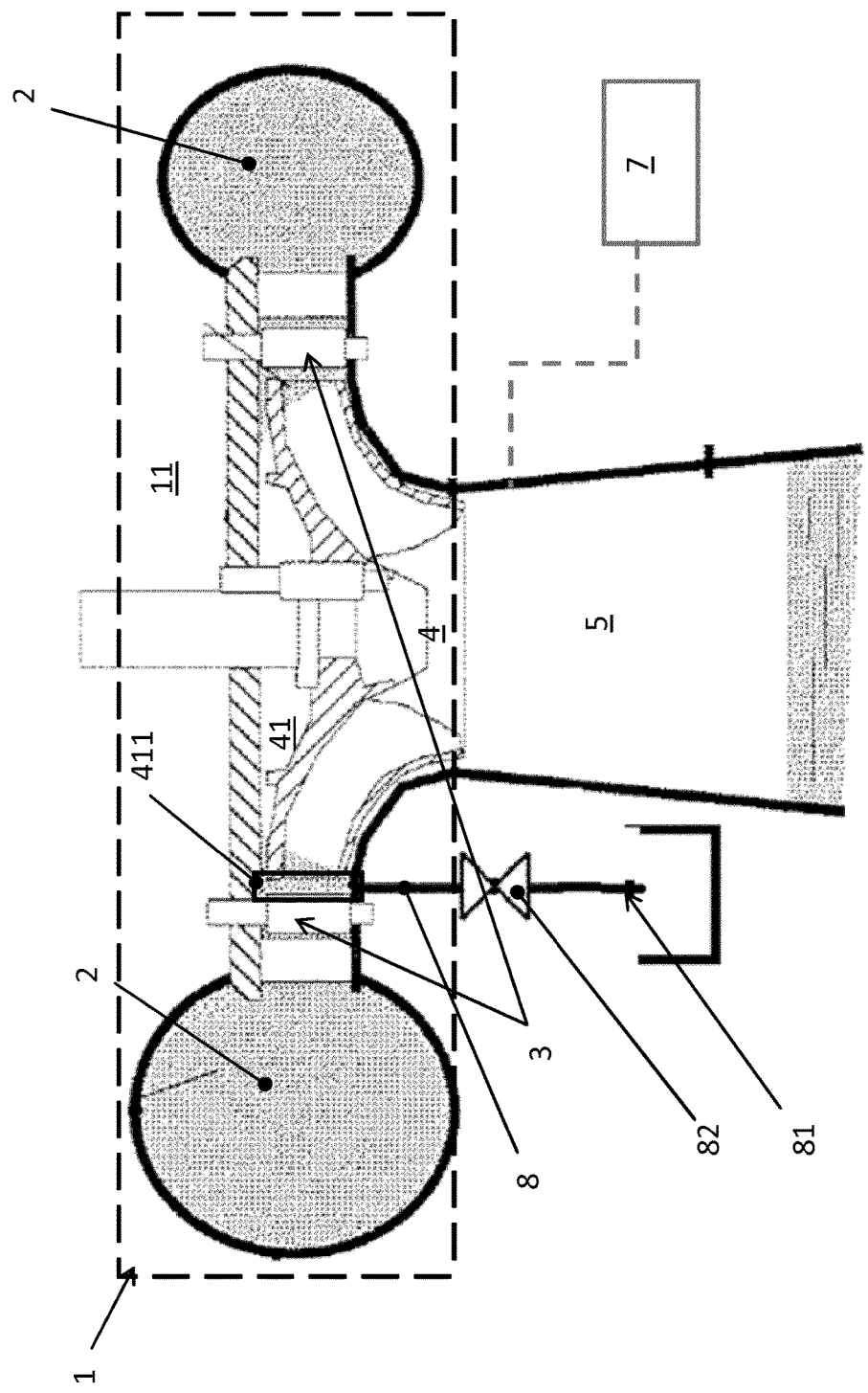
Figure 5:
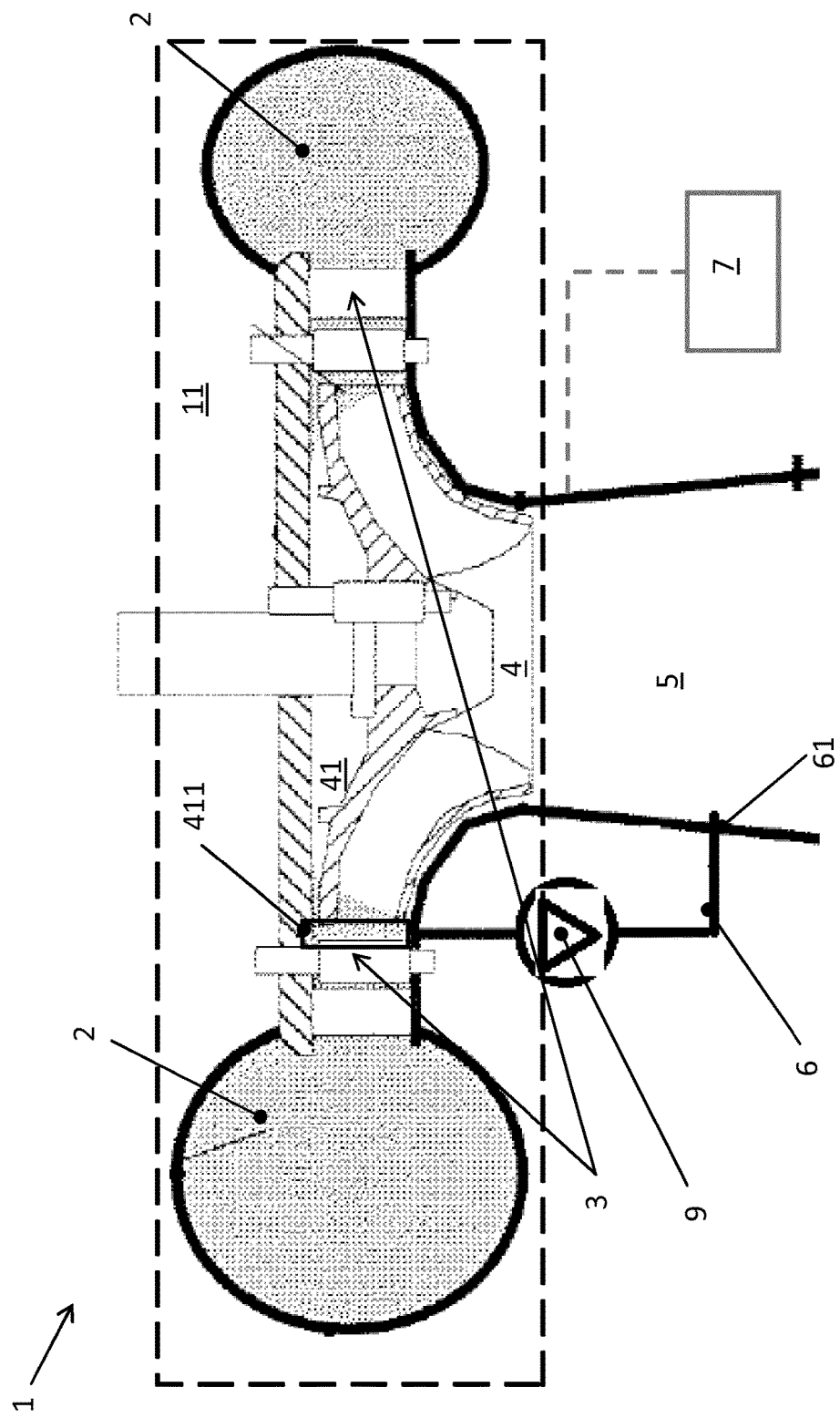

With reference to following FIGS. 4 and 5, it is shown a hydraulic installation according to a second embodiment of the present invention.

More in particular, with reference to FIG. 4, the first connecting element 8 intercepts the hydraulic circuit in correspondence of a gap 411 located into the runner chamber 41, particularly between the wicket gates 3 and the runner 4. Turning to next FIG. 5, the second connecting element 6 intercepts the hydraulic circuit in correspondence of the gap 411 and has an end 61 discharging into the draft tube.

Figure 6B:
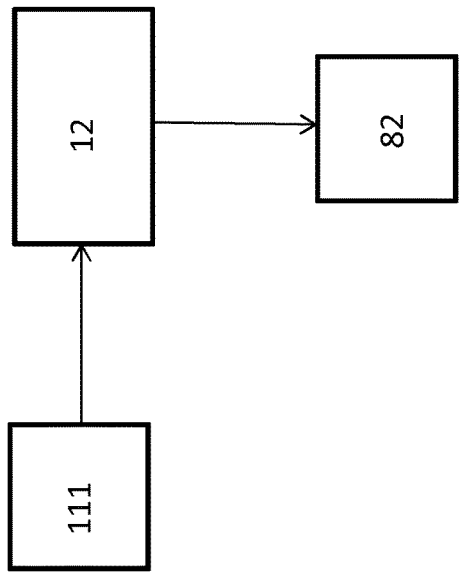
FIGS. 6a-6c show simplified block diagrams illustrating modes of operating the hydraulic installation according to the present invention.
Figure 6C:
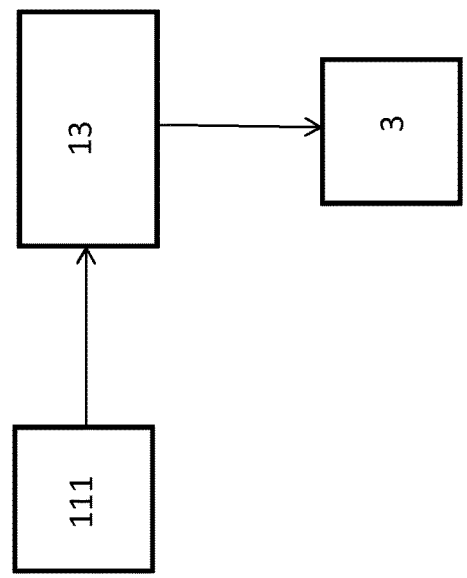
Figure 6A:
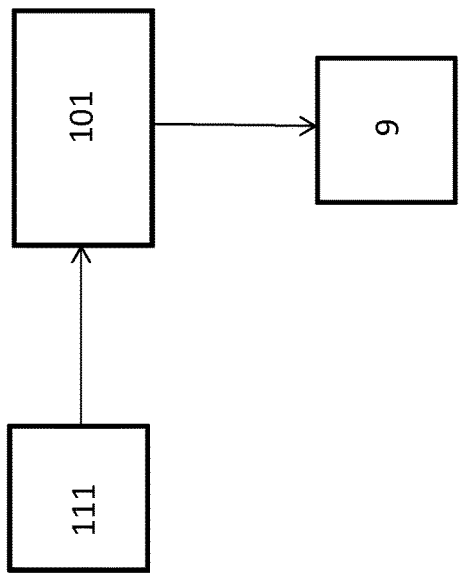

Making now reference to next FIGS. 6a-6c, it is shown in a simplified block diagram an exemplary control logic adopted to monitor and regulate/adjust the pressure in the spiral case particularly during condenser mode operation of the Francis turbine.

According to FIG. 6a, the hydraulic installation comprises a first control unit 11, which is configured to receive an input signal correspondent to a pressure value from the pressure sensors 111 and elaborate an output control signal directed to the pump 9. The arrangement is such that the action of the pump to dewater the spiral case and thus reduce the pressure is regulated based on the pressure values measured in the spiral case during the condenser mode operation.

In alternative, with reference to FIG. 6b, hydraulic installation may comprise a second control unit 12 configured to receive an input signal correspondent to a pressure value from the pressure sensors 111 and elaborate an output control signal directed to the opening/closing valve 82. In particular, opening/closing valve 82 might have a mechanism such to allow partial closing/opening of the same, to further regulate the exhaust of water for dewatering the spiral case and hence gradually reducing its internal pressure.

Alternatively or additionally, hydraulic installation may comprise a third control unit 13 configured to receive an input signal correspondent to a pressure value from the pressure sensors 111 and elaborate an output control signal directed to adjust the pitch of the wicket gates, which are indicated in the block with numeral reference 3. In this way, pressure inside the spiral case may also be regulated allowing the passage of the water flow into the runner.

It is a further object of the present invention to provide a method for retrofitting an existing hydraulic installation according to the state of the art, as the one described with reference to FIG. 1.

In particular, the method includes the step of connecting the first connecting element 8 to the hydraulic circuit, wherein the first connecting element has an end discharging in atmosphere. The first connecting element 8 may also be provided with an opening/closure valves 82 to further improve the process of dewatering the spiral case 2.

Alternatively, the method may include the step of connecting a second connecting element 6 to the runner chamber, and in particular to the gap 411, located between the wicket gates and the runner, and providing a pump 9 along its path.

As a further object of the present invention, it is provided method for operating a hydraulic installation, whereby the hydraulic installation comprises, with reference to FIGS. 2-5, a hydraulic circuit including a spiral casing 2 which defines an annular passage and a plurality of wicket gates distributed there along, wherein the wicked gates are provided with an adjustable pitch such to be moved between a totally open position, allowing water passage, and a closed position where the water passage is interrupted. The hydraulic installation further comprises a runner chamber in fluid communication with said spiral casing and located downstream of the wicket gates; a runner rotatable in the runner chamber; a draft tube arranged below the runner; a source of pressurized air in fluid communication with the draft tube 5; wherein the hydraulic installation comprises a first connecting element 6 arranged between the spiral casing 2 and having an end 81 discharging in atmosphere, the second duct 8 comprising an opening/closure valve 82; or a second connecting element 8 arranged between the hydraulic circuit 11 and the draft tube 5, the second connecting element 8 comprising a pump 9.

The method for operating the hydraulic installation includes the step of measuring the pressure inside the spiral casing 2 and elaborating a control output signal, based on the pressure measurement, directed to adjust the pitch of the wicket gates or, in alternative, to control the opening/closure of the valve 82 or, in alternative, to regulate the pump 9.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hydraulic installation, comprising:
   a hydraulic circuit comprising:
      a spiral casing defining an annular passage comprising a plurality of wicket gates distributed there along;
      a runner chamber in fluid communication with said spiral casing and located downstream of said plurality of wicket gates;
      a runner rotatable within said runner chamber;
      a draft tube arranged below said runner; and
      a source of pressurized air in fluid communication with said draft tube;
   a first connecting element fluidly connected to said hydraulic circuit and having an end discharging in atmosphere or, in alternative to said first connecting element, a second connecting element fluidly connected to said hydraulic circuit and having an end discharging in said draft tube, wherein said second connecting element comprises a pump; and
   one or more pressure sensors arranged within said spiral case for monitoring pressure within the spiral case; and
   at least one control unit controlling pressure in the spiral case during a condenser mode of the hydraulic circuit based on the monitored pressure.

2. The hydraulic installation of claim 1, wherein said first connecting element intercepts said hydraulic circuit in correspondence of said spiral casing.

3. The hydraulic installation of claim 1, wherein said first connecting element intercepts said hydraulic circuit in correspondence of a gap of said runner chamber, the gap being located between said plurality of wicket gates and said runner.

4. The hydraulic installation of claim 1, wherein said second connecting element intercepts said hydraulic circuit in correspondence of said spiral casing.

5. The hydraulic installation of claim 1, wherein said second connecting element intercepts said hydraulic circuit in correspondence of a gap of said runner chamber, the gap being located between said plurality of wicket gates and said runner.

6. The hydraulic installation of claim 1, wherein the at least one control unit further comprises a first control unit configured to receive an input signal correspondent to a pressure value from said one or more pressure sensors and generate an output control signal directed to said pump.

7. The hydraulic installation of claim 1, wherein said first connecting element comprises an opening/closure valve.

8. The hydraulic installation of claim 7, wherein the at least one control unit further comprises a second control unit configured to receive an input signal correspondent to a pressure value from said one or more pressure sensors and generate an output control signal directed to said opening/closure valve.

9. The hydraulic installation of claim 1, wherein said wicket gates in said annular passage have an adjustable pitch such to be moved between a totally open position, allowing water passage to said runner, and a closed position where the water passage is interrupted.

10. The hydraulic installation of claim 9, wherein the at least one control unit further comprises a third control unit configured to receive an input signal correspondent to a pressure value from said one or more pressure sensors and generate an output control signal directed to adjust the pitch of said wicket gates.

11. The hydraulic installation of claim 1, wherein said first or second connecting element intercepts said hydraulic circuit in correspondence of a summit of said spiral casing.

12. A method for retrofitting an existing hydraulic installation, the existing hydraulic installation having a hydraulic circuit with a spiral casing defining an annular passage including a plurality of wicket gates distributed there along, a runner chamber in fluid communication with the spiral casing and located downstream of the plurality of wicket gates, a runner rotatable in the runner chamber, a draft tube arranged below the runner, a source of pressurized air in fluid communication with the draft tube, the method comprising:

connecting a first connecting element in fluid communication with the hydraulic circuit, the first connecting element having an end discharging in atmosphere or connecting a second connecting element in fluid communication with the hydraulic circuit, the second connecting element having a pump;

providing one or more pressure sensors within said spiral case to monitor pressure within the spiral case; and providing a control unit to control pressure in the spiral case during a condenser mode of the hydraulic circuit based on the monitored pressure.

13. The method of claim 12, further comprising positioning an opening/closure valve along said first connecting element.

14. A method for operating a hydraulic installation, the hydraulic installation having a hydraulic circuit with a spiral casing defining an annular passage including a plurality of wicket gates distributed there along, the plurality of wicket gates having an adjustable pitch, a runner chamber in fluid communication with the spiral casing and located downstream of the plurality of wicket gates, a runner rotatable in the runner chamber, a draft tube arranged below the runner, a source of pressurized air in fluid communication with the draft tube, a first connecting element arranged between the spiral casing and having an end discharging in atmosphere, the first connecting element having an opening/closure valve, or a second connecting element arranged between the hydraulic circuit and the draft tube, the second connecting element having a pump, the method comprising:

measuring, via one or more pressure sensors arranged within said spiral case, pressure inside the spiral casing;

generating a control output signal based on the pressure measurement adjusting a pitch of the plurality of wicket gates, controlling an opening/closure of the valve, or regulating the pump based on the control output signal so as to control pressure in the spiral case during a condenser mode of the hydraulic circuit.

* * * * *